United States Patent
Najaf-Zadeh et al.

(10) Patent No.: US 9,767,618 B2
(45) Date of Patent: Sep. 19, 2017

(54) ADAPTIVE AMBISONIC BINAURAL RENDERING

(71) Applicant: Samsung Electronics Co., Ltd, Suwon-si (KR)

(72) Inventors: Hossein Najaf-Zadeh, Allen, TX (US); Barry Woodward, Flower Mound, TX (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 75 days.

(21) Appl. No.: 14/988,589

(22) Filed: Jan. 5, 2016

(65) Prior Publication Data

US 2016/0241980 A1 Aug. 18, 2016

Related U.S. Application Data

(60) Provisional application No. 62/108,774, filed on Jan. 28, 2015, provisional application No. 62/108,779, filed on Jan. 28, 2015.

(51) Int. Cl.
| | |
|---|---|
| *H04R 5/02* | (2006.01) |
| *G06T 19/00* | (2011.01) |
| *H04S 7/00* | (2006.01) |
| *G06F 3/01* | (2006.01) |
| *G06F 3/038* | (2013.01) |

(52) U.S. Cl.
CPC ............ *G06T 19/006* (2013.01); *G06F 3/012* (2013.01); *G06F 3/038* (2013.01); *H04S 7/303* (2013.01); *G06F 2203/0381* (2013.01); *H04S 2420/01* (2013.01); *H04S 2420/11* (2013.01)

(58) Field of Classification Search
CPC .. H04S 2420/01; H04S 7/303; H04S 2420/11; G06F 3/012; G06F 3/038; G06F 2203/0381; G06T 19/006
USPC ........................................................ 381/310
See application file for complete search history.

(56) References Cited

U.S. PATENT DOCUMENTS 8,587,631 B2 * 11/2013 Etter ..................... H04N 7/142
340/10.3

* cited by examiner

*Primary Examiner* — Paul S Kim (57) ABSTRACT

A user equipment (UE) includes a memory element and a processor. The memory element is configured to store a plurality of head-related transfer functions. The processor is configured to receive an audio signal. The audio signal includes a plurality of ambisonic signals. The processor is also configured to identify an orientation of the UE based on physical properties of the UE. The processor is also configured to rotate the plurality of ambisonic signals based on the orientation of the UE. The processor is also configured to filter the plurality of ambisonic signals using the plurality of head-related transfer functions to form speaker signals. The processor is also configured to output the speaker signals.

16 Claims, 5 Drawing Sheets

ADAPTIVE AMBISONIC BINAURAL RENDERING

CROSS-REFERENCE TO RELATED APPLICATION(S) AND CLAIM OF PRIORITY

The present application claims priority to U.S. Provisional Patent Application Ser. No. 62/108,774, filed Jan. 28, 2015, entitled "ADAPTIVE AMBISONIC BINAURAL RENDERING" and U.S. Provisional Patent Application Ser. No. 62/108,779, filed Jan. 28, 2015, entitled "AUDIO DOWNMIXING VIA AMBISONIC CONVERSION". The contents of the above-identified patent documents are incorporated herein by reference.

TECHNICAL FIELD

The present application relates generally to ambisonic signals and, more specifically, to an apparatus and method for adaptive ambisonic binaural rendering.

BACKGROUND

Ambisonics is an effective technique to encode and reconstruct sound fields. This technique is based on the orthogonal decomposition of a sound field in the spherical coordinates in the 3D space or cylindrical decomposition in the 2D space. In the decoding process, the ambisonic signals are decoded to produce speaker signals. The higher the order of the ambisonics, the finer reconstruction of the sound fields achieved. Ambisonics provides significant flexibility to recreate 3D audio on any playback setup such as large number of loudspeakers and headphones. Particularly, in mobile applications and Head-Mounted Displays (HMD), ambisonic rendering to headphones is of great interest.

SUMMARY

In an embodiment, a user equipment (UE) is provided that includes a memory element and a processor. The memory element is configured to store a plurality of head-related transfer functions. The processor is configured to receive an audio signal. The audio signal includes a plurality of ambisonic signals. The processor is also configured to identify an orientation of the UE based on physical properties of the UE. The processor is also configured to rotate the plurality of ambisonic signals based on the orientation of the UE. The processor is also configured to filter the plurality of ambisonic signals using the plurality of head-related transfer functions to form speaker signals. The processor is also configured to output the speaker signals.

In another embodiment, a method is provided for audio signal processing. The method includes receiving an audio signal. The audio signal includes a plurality of ambisonic signals. The method also includes identifying an orientation of the UE based on physical properties of the UE. The method also includes rotating the plurality of ambisonic signals based on the orientation of the UE. The method also includes the plurality of ambisonic signals using a plurality of head-related transfer functions to form speaker signals. The method also includes outputting the speaker signals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus or method.

Figure 1:
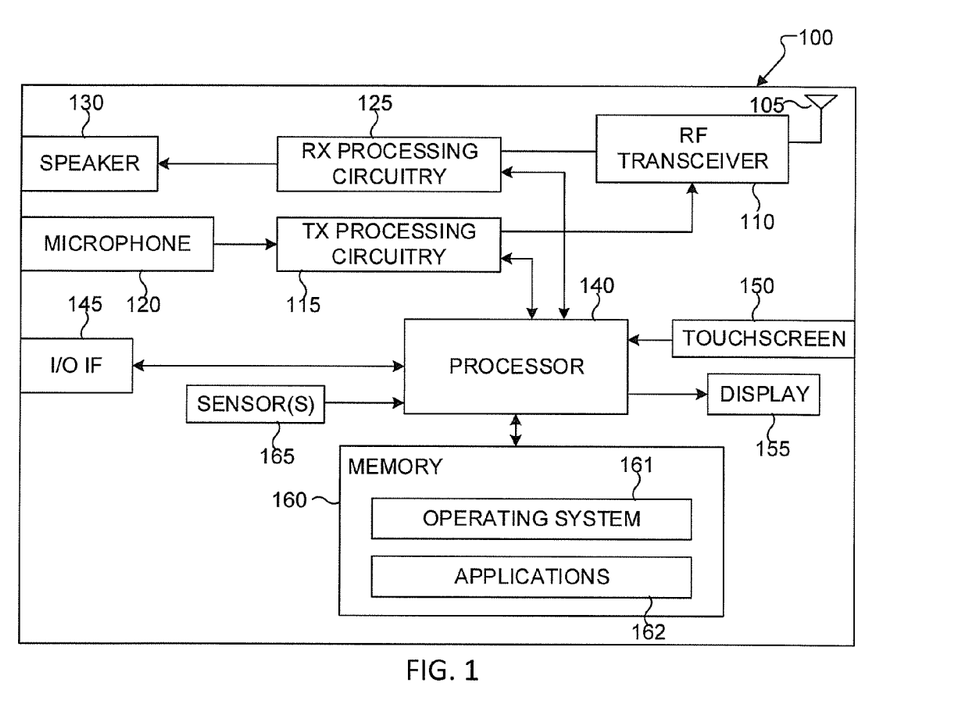
FIG. 1 illustrates an example HMD according to embodiments of the present disclosure and in which embodiments of the present disclosure may be implemented.

FIG. 1 illustrates an example HMD 100 according to embodiments of the present disclosure and in which embodiments of the present disclosure may be implemented. The embodiment of the HMD 100 illustrated in FIG. 1 is for illustration only, the HMD 100 comes in a wide variety of configurations, and FIG. 1 does not limit the scope of this disclosure to any particular implementation of a HMD.

In various embodiments, the HMD 100 may take different forms, and the present disclosure is not limited to any particular form. For example, the HMD 100 may be a mobile communication device, such as, for example, a user equipment, a mobile station, a subscriber station, a wireless terminal, a smart phone, a tablet, etc., that is mountable within a headset for VR and/or AR applications. In other examples, the HMD 100 may include the headset and take the form of a wearable electronic device, such as, for example, glasses, goggles, a helmet, etc., for the VR and/or AR applications.

As shown in FIG. 1, the HMD 100 includes an antenna 105, a radio frequency (RF) transceiver 110, transmit (TX) processing circuitry 115, a microphone 120, and receive (RX) processing circuitry 125. The HMD 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller. On another embodiment, the processor 140 could also be implemented as processing circuitry. The processor 140 can carry out the operations or instructions of any process disclosed herein.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the HMD 100 with the ability to connect to other devices, such as laptop computers and handheld computers. The I/O interface 145 is the communication path between these accessories and the processor 140.

The processor 140 is also coupled to the touchscreen 150 and the display 155. The operator of the HMD 100 can use the touchscreen 150 to enter data and/or inputs into the HMD 100. The display 155 may be a liquid crystal display, light-emitting diode (LED) display, optical LED (OLED), active matrix OLED (AMOLED), or other display capable of rendering text and/or graphics, such as from web sites, videos, games, etc.

The memory 160 is coupled to the processor 140. Part of the memory 160 could include a random access memory (RAM), and another part of the memory 160 could include a Flash memory or other read-only memory (ROM).

HMD 100 further includes one or more sensor(s) 165 that can meter a physical quantity or detect an activation state of the HMD 100 and convert metered or detected information into an electrical signal. For example, sensor 165 may include one or more buttons for touch input, e.g., on the headset or the HMD 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. As will be discussed in greater detail below, one or more of these sensor(s) 165 may be used to control audio rendering, determine the orientation and facing direction of the user for 3D content display identification, etc. Any of these sensor(s) 165 may be located within the HMD 100, within a headset configured to hold the HMD 100, or in both the headset and HMD 100, for example, in embodiments where the HMD 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the HMD 100 may include circuitry for and applications for providing 3D audio for a HMD. Although FIG. 1 illustrates one example of HMD 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the HMD 100 configured as a mobile telephone, tablet, or smartphone, the HMD 100 could be configured to operate as other types of mobile or stationary devices.

Embodiments of the present disclosure provide an adaptive ambisonic binaural rendering framework for stereoscopic 3D VR or AR applications on the HMD 100. For VR experience using the HMD 100, the user's head motion, i.e., the movement of the HMD 100, is tracked using sensor(s) 165 in the HMD 100 and used to control the binaural rendering. In this disclosure, ambisonic signals are rotated according to the HMD 100 orientation and then mapped to virtual speakers located at fixed positions. The rotated ambisonic signals and a fixed set of Head-Related Transfer Functions (HRTF) are used to produce ear signals.

One or more embodiments of this disclosure recognize and take into account that ambisonic rendering can be adapted to the HMD 100 orientation to recreate an original sound field. Various embodiments of this disclosure provide a system for adaptive ambisonic binaural rendering to make audio scene independent from head movement. Binaural ambisonic rendering can be done through mapping of ambisonic signals to virtual speakers and then filtering each loudspeaker signal with a pair of Head-Related Transfer Functions (HRTF) corresponding to the position of the virtual speakers (relative to the head).

In an embodiment of this disclosure, for ambisonic rendering, the positions of virtual speakers remain unchanged, and for each new HMD orientation, the original ambisonic signals and a new set of HRTFs are used to produce ear signals. In another embodiment of this disclosure, the positions of virtual speakers are changed according to HMD orientation to make the audio scene independent from head movement. The original ambisonic signals and a new set of HRTFs corresponding to the positions of the speakers are used to produce speaker signals. In yet another embodiment of this disclosure, ambisonic signals are rotated according to the HMD (or head) orientation and then mapped to virtual speakers located at fixed positions. Then the rotated ambisonic signals and a fixed set of HRTFs are used to produce ear signals. This embodiment is advantageous as it needs only one set of HRTFs for binaural rendering, one HRTF for each headphone speaker (or ear).

Figure 2:
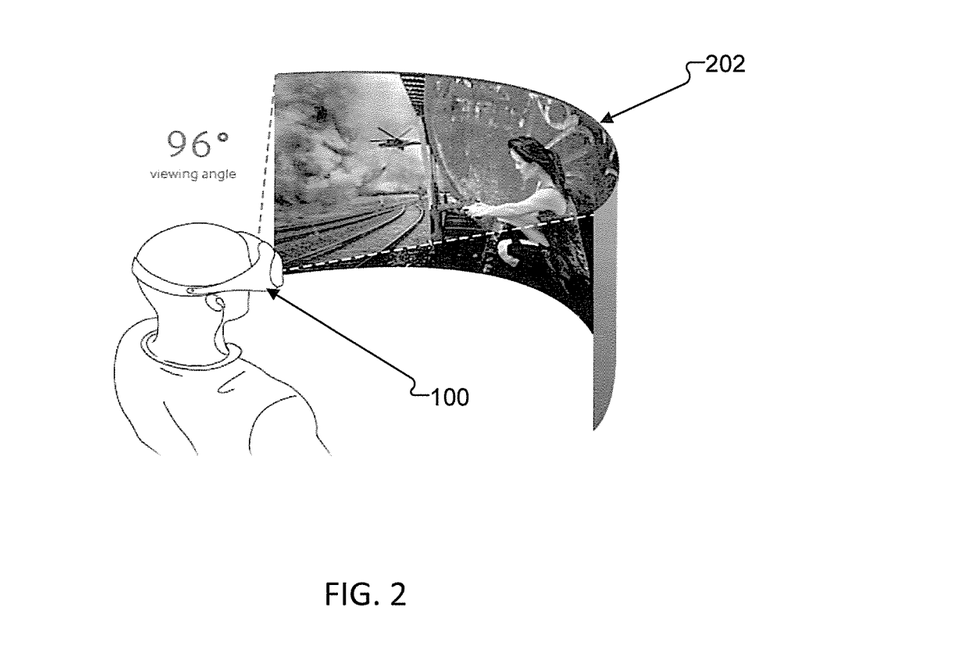
FIG. 2 illustrates an example view with content in an HMD according to an embodiment of this disclosure.

FIG. 2 illustrates an example view 202 with content in an HMD 100 according to an embodiment of this disclosure. In FIG. 2, a user is wearing the HMD 100 and is seeing the view 202. The view 202 includes a ninety-six degree viewing angle. In different embodiments, other viewing angles can be used.

Various embodiments of this disclosure recognize and take into account that HMD 204 with mega sized screens and ninety-six degree viewing angles allow users to feel the world beyond peripheral vision. There are applications on the HMD 100 with a mobile device LCD as the screen. Users might want to use a mobile device without removing the HMD 100. The user may desire to seamlessly switch between the VR world and the real world. In an example, a user is watching a movie in HMD 100 and wants to write an email. In this example, the user can draft the email in the VR environment without removing the HMD 100. The mobile device can display the mobile device environment in the VR world.

Various embodiments of the present disclosure provide content within an angular range that is wider than the user's current 3D view frustum 310. The angular range 315 (e.g., on the x-z plane assuming a Cartesian coordinate system with the x direction generally denoting left/right or yaw, the y direction generally denoting forward/backwards, and the z direction generally denoting up/down or pitch), within which the UI elements 305 are to be placed is configured. In some examples, (e.g., when more UI elements 305 exist than can fit), the HMD 100 displays, either actually or virtually (i.e., not actually displayed on the display 155 but actually displayed when the HMD 100 is moved to a location where the element is virtually displayed), some UI elements 305 outside the current 3D view frustum 310. However, the HMD 100 places these UI elements 305 within the angular range 315 for the UI so that the user would not have to turn the head too much to the left or the right (i.e., yaw or x movement) to see all displayed UI elements 305. Note, while certain examples are given in a Cartesian coordinate system, any suitable coordinate system may be used with any tuple serving as the default coordinate directions. The HMD 100 places the elements within the user's current 3D view frustum, i.e., the portion of the total viewable 3D space that is currently viewable by the user as a result of the HMD's 100 current detected orientation and facing direction.

As discussed above, the HMD 100 detects the user's head motions, i.e., the movement of the HMD 100, using the sensor(s) 165 on the HMD 100 and/or headset, such as, for example, a gyroscope, an accelerometer, etc. The HMD 100 displays the UI elements 305 as well as other elements of the display (e.g., content) to respond to the head motions to simulate looking at and interacting with the real-world view and objects.

One or more embodiments of this disclosure recognize and take into account the difficulty in identifying a rotation matrix for any direction in 3D space. Rotation matrices for up to second order ambisonics (Fu-Ma format) are identified. Many ambisonic recordings are third and higher order. As such, there is a need to develop techniques for rotation of ambisonic signals with any order. Another issue would be real-time binaural rendering with no discontinuities (in time and space) while changing the ambisonic signals according to the head movement.

Figure 3:
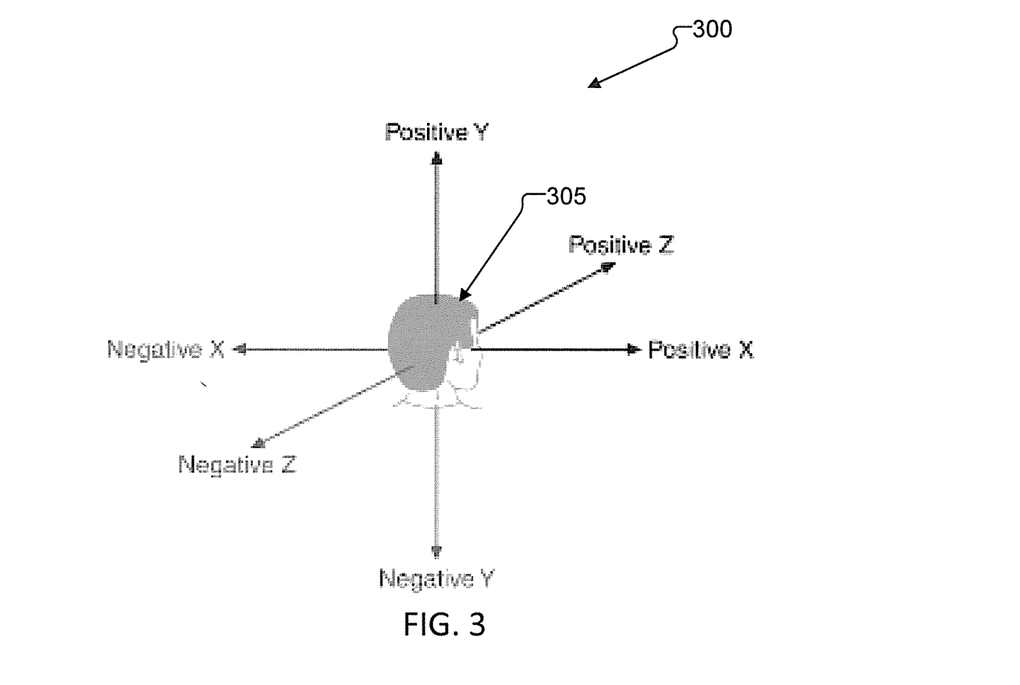
FIG. 3 illustrates an example Cartesian domain with respect to a user according to an embodiment of this disclosure.

FIG. 3 illustrates an example Cartesian domain 300 with respect to a user 305 according to an embodiment of this disclosure. In FIG. 3, a user 305 is seen without wearing the HMD 100, but could be wearing the HMD 100. The coordinates in the Cartesian domain 300 may also be considered with respect to the HMD 100. The axes X, Y, and Z can be in positive and negative directions. The user 305 can also rotate within the Cartesian domain 300.

One or more embodiments of this disclosure provide different techniques for adaptive ambisonic rendering. The different techniques are based on the equivalence of a HMD rotation in one direction and sound field rotation in the opposite direction. One embodiment is based on changing the location of virtual speakers to make the reproduced sound field independent from head movement. In this embodiment, positions of virtual speakers are changed sequentially for rotation around the three axes X, Y, and Z in the Cartesian domain 320. This embodiment can be used to do adaptive binaural rendering for any ambisonic order. In another embodiment, a new rotation matrix for third order ambisonics is applied. This embodiment rotates ambisonics (for example, up to third order) in any direction in 3D space through simple matrix multiplication and can use only one set of HRTFs. In other examples, fourth order, or higher, ambisonics can be used as well.

One or more embodiments of this disclosure provide rotating ambisonic signals according to the orientation of an HMD. The orientation can be the orientation within a virtual reality defined by three axes in the Cartesian domain (i.e. X, Y, and Z) 300. The orientation can also include a position or location within the virtual reality. The location and orientation of the HMD can be determined using sensor(s) 165 as shown in FIG. 1. In different embodiments of this disclosure, the head of the user 305 can be tracked instead of the HDM. The tracking can be performed by sensor(s) 165 as shown in FIG. 1 or by external camera systems.

Figure 4:
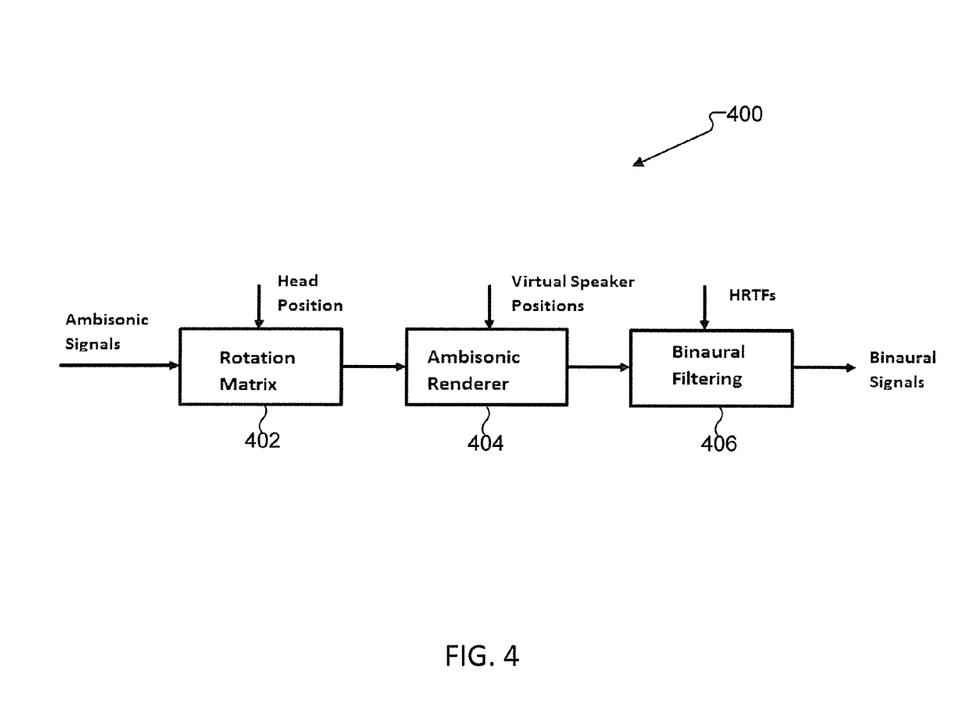
FIG. 4 illustrates block diagram for adaptive ambisonic binaural rendering according to an embodiment of this disclosure

FIG. 4 illustrates block diagram 400 for adaptive ambisonic binaural rendering according to an embodiment of this disclosure. The embodiment of the adaptive ambisonic binaural rendering illustrated in FIG. 4 is for illustration only.

At block 402, a rotation matrix can be applied to ambisonic signals. The rotation matrix is determined based on a head positions or HMD orientation. Sensors in the HMD or external systems such as camera system or infrared detectors can identify the orientation and a processor can select a rotation matrix based on the orientation. At block 404, the processor can perform ambisonic rendering by mapping the positions of the virtual speakers. At block 406, a processor can perform binaural filtering by applying the HRTFs to the ambisonic signals to produce binaural signals, or speaker signals. The same HRTFs can be applied no matter the orientation of the HMD.

One or more embodiments of this disclosure also provide adaptive binaural rendering by relocating virtual speakers. Algorithms for sound field rotation around the X, Y, and Z axes are provided by this disclosure. In this embodiment, a sound field can be rotated sequentially for rotation around the X axis (i.e. roll), Y axis (i.e. pitch), and Z axis (i.e. yaw).

For rotation of virtual speakers around the Z axis only the azimuth may be changed. An azimuth of each virtual speaker can be shifted by $\gamma$, with $\gamma$ being the rotation angle around the Z axis. The azimuth can be modified by:

$$\theta' = \theta + \gamma, \quad (1)$$

where $\theta$ and $\theta'$ are the original and the modified azimuth, respectively.

For rotation of virtual speakers around the X axis (i.e. roll), both azimuth and elevation of virtual speakers are changed. The positions of virtual speakers are modified accordingly. The high order ambisonic (HOA) signals are mapped to virtual speakers at new locations and converted to binaural signals using a set of HRTFs corresponding to the positions of virtual speakers relative to the head. If a virtual speaker is located at $\theta_i$ and $\phi_i$ (azimuth and elevation respectively), then the new positions are $\theta'_i$ and $\phi'_i$. Since rotation around the X axis does not change the projection to the X axis, the new position of each virtual speaker is given by the following procedure.

$$\sqrt{3}\cos(\theta'_i)\cos(\phi'_i) = \sqrt{3}\cos(\theta_i)\cos(\phi_i) \quad (2)$$

The Y and Z axes are rotated as follows:

$$\begin{pmatrix} y' \\ z' \end{pmatrix} = \begin{pmatrix} \cos(\alpha) & -\sin(\alpha) \\ \sin(\alpha) & \cos(\alpha) \end{pmatrix} \begin{pmatrix} y \\ z \end{pmatrix}, \quad (3)$$

where $\alpha$ is the rotation angle around the X axis. The values y, z, y' and z' (in the N3D ambisonic format) are given by:

$$y = \sqrt{3}\sin(\theta_i)\cos(\phi_i), z = \sqrt{3}\sin(\phi_i)$$

$$y' = \sqrt{3}\sin(\theta'_i)\cos(\phi'_i), z' = \sqrt{3}\sin(\phi'_i) \quad (4)$$

The new position of the virtual speaker is given by:

$$\phi'_i = \arcsin[\sin(\alpha)\sin(\theta_i)\cos(\phi_i) + \cos(\alpha)\sin(\phi_i)] \quad (5)$$

$$\theta'_i = \arccos\left(\frac{\cos(\theta_i)\cos(\phi_i)}{\cos(\phi'_i)}\right)$$

The HOA signals are mapped to virtual speakers at the new locations and filtered with the corresponding HRTFs to find the binaural signals.

For rotation of virtual speakers around the Y axis, the same procedure as described for the X axis is used. Since rotation around the Y axis does not change the projection to the Y axis, the procedure is as follows.

$$\sqrt{3}\sin(\theta'_i)\cos(\phi'_i) = \sqrt{3}\sin(\theta_i)\cos(\phi_i) \quad (6)$$

Also, the X and Z axes will be rotated as follows:

$$\begin{pmatrix} x' \\ z' \end{pmatrix} = \begin{pmatrix} \cos(\beta) & -\sin(\beta) \\ \sin(\beta) & \cos(\beta) \end{pmatrix} \begin{pmatrix} x \\ z \end{pmatrix}, \quad (7)$$

where $\beta$ is the rotation angle around the Y axis, and the values y, z, y' and z' (in the N3D ambisonic format) are:

$$x = \sqrt{3}\cos(\theta_i)\cos(\phi_i), z = \sqrt{3}\sin(\phi_i)$$

$$x' = \sqrt{3}\cos(\theta'_i)\cos(\phi'_i), z' = \sqrt{3}\sin(\phi'_i) \quad (8)$$

The new position of the virtual speaker is given by:

$$\phi'_i = \arcsin[\sin(\beta)\cos(\theta_i)\cos(\phi_i) + \cos(\beta)\sin(\phi_i)] \quad (9)$$

$$\theta'_i = \arcsin\left(\frac{\sin(\theta_i)\cos(\phi_i)}{\cos(\phi'_i)}\right)$$

The HOA signals are mapped to virtual speakers at the new locations and filtered with the corresponding HRTFs to find the binaural signals.

One or more embodiments of this disclosure provide another technique to rotate a sound field using a rotation matrix. This embodiment provides three new rotation matrices for rotating third order ambisonic signals around the three axes in 3D space. For any direction, ambisonic signals can be modified through a matrix multiplication as follows:

$$B' = RB \quad (10)$$

where R is the rotation matrix around an axis, and B and B' are the original and modified ambisonic signals, respectively. In this embodiment, the positions of virtual speakers relative to the HMD remain unchanged and as such only one set of HRTFs is used for binaural rendering.

The different embodiments of this disclosure provide adaptive HOA binaural rendering based on sound field rotation in 3D space. Contrary to channel-based methods, in one of the embodiments, only one set of HRTFs corresponding to a fixed playback setup can be used. In comparison to channel-based binaural rendering, HOA-based methods provide a higher quality if there is not a very large set of HRTFs available to the binaural renderer. Sound fields can be edited in the ambisonic domain for artistic purposes prior to rendering to headphones.

An embodiment of this disclosure provides third order rotation matrices for N3D-encoded B-Format (used in MPEG audio material) for three axes, X, Y, and Z in the Cartesian domain. Rotation in a direction can be done by multiplying these rotation matrices.

For rotation around the X axis (i.e., roll), the third order rotation matrix can be a 16×16 matrix. The sixteen original ambisonic signals can be labeled as follows:

$$B = [W, X, Y, Z, T, R, S, U, Q, O, M, K, L, N, P]. \quad (11)$$

The sixteen modified ambisonic signals can be labeled as follows:

$$B' = [W', X', Y', Z', V', T', R', S', U', Q', O', M', K', L', N', P'] \quad (12)$$

Assuming an all-zero rotation matrix and only non-zero values in the rotation matrix, where $\alpha$ is the rotation angle around the X axis, the modified signals are as follows:

$$W' = W \quad (13)$$

$$X' = X \quad (14)$$

$$Y' = \cos(\alpha)Y - \sin(\alpha)Z \quad (15)$$

$$Z' = \sin(\alpha)Y + \cos(\alpha)Z \quad (16)$$

$$V' = \cos(\alpha)V - \sin(\alpha)S \quad (17)$$

$$T' = \cos(2\alpha)T - \frac{\sqrt{3}}{2}\sin(2\alpha)\,R - \frac{1}{2}\sin(2\alpha)U \quad (18)$$

$$R' = \frac{\sqrt{3}}{2}\sin(2\alpha)T + \left(\frac{3}{4}\cos(2\alpha) + \frac{1}{4}\right)R + \left(\frac{\sqrt{3}}{4}\cos(2\alpha) - \frac{\sqrt{3}}{4}\right)U \quad (19)$$

$$S' = \sin(\alpha)V + \cos(\alpha)S \quad (20)$$

$$U' = \frac{1}{2}\sin(2\alpha)T + \left(\frac{\sqrt{3}}{4}\cos(2\alpha) - \frac{\sqrt{3}}{4}\right)R + \left(\frac{1}{4}\cos(2\alpha) + \frac{3}{4}\right)U \quad (21)$$

$$Q' = \left(\frac{1}{4}\cos^3(\alpha) + \frac{3}{4}\cos(\alpha)\right)Q + \left(\frac{\sqrt{15}}{4}\cos^3(\alpha) - \frac{\sqrt{15}}{4}\cos(\alpha)\right)M + \frac{\sqrt{10}}{4}\sin^3(\alpha)K + \left(\frac{\sqrt{6}}{4}\sin^3(\alpha) - \frac{\sqrt{6}}{2}\sin(\alpha)\right)N \quad (22)$$

$$O' = \cos(2\alpha)O - \frac{\sqrt{10}}{4}\sin(2\alpha)L - \frac{\sqrt{6}}{4}\sin(2\alpha)P \quad (23)$$

$$M' = -\frac{\sqrt{15}}{4}\cos(\alpha)\sin^2(\alpha)Q + \left(\cos^3(\alpha) - \frac{11}{4}\cos(\alpha)\sin^2(\alpha)\right)M + \left(\frac{\sqrt{6}}{4}\sin^3(\alpha) - \sqrt{6}\sin(\alpha)\cos^2(\alpha)\right)K + \left(\frac{\sqrt{10}}{4}\sin^3(\alpha) - \frac{\sqrt{10}}{2}\sin(\alpha)\cos^2(\alpha)\right)N \quad (24)$$

$$K' = -\frac{\sqrt{10}}{4}\sin^3(\alpha)Q + \left(-\frac{\sqrt{6}}{4}\sin^3(\alpha) + \sqrt{6}\sin(\alpha)\cos^2(\alpha)\right)M + \left(\cos^3(\alpha) - \frac{3}{2}\cos(\alpha)\sin^2(\alpha)\right)K - \frac{\sqrt{15}}{4}\cos(\alpha)\sin^2(\alpha)\,N \quad (25)$$

$$L' = \frac{\sqrt{10}}{2}\sin(\alpha)\cos(\alpha)O + \left(\cos^2(\alpha) - \frac{1}{4}\sin^2(\alpha)\right)L - \frac{\sqrt{15}}{4}\sin^2(\alpha)P \quad (26)$$

$$N' = \left(\frac{\sqrt{6}}{4}\sin(\alpha) + \frac{\sqrt{6}}{4}\cos^2(\alpha)\sin(\alpha)\right)Q + \left(\frac{\sqrt{10}}{2}\sin(\alpha) - \frac{3\sqrt{10}}{4}\sin^3(\alpha)\right)M + \left(\frac{\sqrt{15}}{2}\cos^3(\alpha) - \frac{\sqrt{15}}{2}\cos(\alpha)\right)K + \left(\frac{3}{2}\cos^3(\alpha) - \frac{1}{2}\cos(\alpha)\right)N \quad (27)$$

$$P' = \frac{\sqrt{6}}{2}\sin(\alpha)\cos(\alpha)O - \frac{\sqrt{15}}{4}\sin^2(\alpha)L + \left(\frac{1}{4} + \frac{3}{4}\cos^2(\alpha)\right)P \quad (28)$$

For rotation around the Y axis (i.e., pitch), the third order rotation matrix can be a 16×16 matrix, where β is the rotation angle around the Y axis, the modified signals are as follows:

$$W' = W \quad (29)$$

$$X' = \cos(\beta)X - \sin(\beta)Z \quad (30)$$

$$Y' = Y \quad (31)$$

$$Z' = \sin(\beta)X + \cos(\beta)Z \quad (32)$$

$$V' = \cos(\beta)V - \sin(\beta)T \quad (33)$$

$$T' = \sin(\beta)V + \cos(\beta)T \quad (34)$$

$$R' = \frac{\sqrt{3}}{2}\sin(2\beta)S + \left(\frac{3}{4}\cos(2\beta) + \frac{1}{4}\right)R - \left(\frac{\sqrt{3}}{4}\cos(2\beta) - \frac{\sqrt{3}}{4}\right)U \quad (35)$$

$$S' = \cos(2\beta)S - \frac{\sqrt{3}}{2}\sin(2\beta)R + \frac{1}{2}\sin(2\beta)U \quad (36)$$

$$U' = \frac{-1}{2}\sin(2\beta)S - \left(\frac{\sqrt{3}}{4}\cos(2\beta) - \frac{\sqrt{3}}{4}\right)R + \left(\frac{1}{4}\cos(2\beta) + \frac{3}{4}\right)U \quad (37)$$

$$Q' = \frac{-\sqrt{6}}{2}\sin(\beta)\cos(\beta)O + \frac{\sqrt{15}}{4}\sin^2(\beta)\,M + \left(\frac{1}{4} + \frac{3}{4}\cos^2(\beta)\right)Q \quad (38)$$

$$O' = \cos(2\beta)O - \frac{\sqrt{10}}{4}\sin(2\beta)M + \frac{\sqrt{6}}{4}\sin(2\beta)Q \quad (39)$$

$$M' = \frac{\sqrt{10}}{2}\sin(\beta)\cos(\beta)O + \left(\cos^2(\beta) - \frac{1}{4}\sin^2(\beta)\right)M + \frac{\sqrt{15}}{4}\sin^2(\beta)Q \quad (40)$$

$$K' = \frac{\sqrt{10}}{4}\sin^3(\beta)P + \left(-\frac{\sqrt{6}}{4}\sin^3(\beta) + \sqrt{6}\sin(\beta)\cos^2(\beta)\right)L + \left(\cos^3(\beta) - \frac{3}{2}\cos(\beta)\sin^2(\beta)\right)K + \frac{\sqrt{15}}{4}\cos(\beta)\sin^2(\beta)N \quad (41)$$

$$L' = \frac{\sqrt{15}}{4}\cos(\beta)\sin^2(\beta)P + \left(\cos^3(\beta) - \frac{11}{4}\cos(\beta)\sin^2(\beta)\right)L + \left(\frac{\sqrt{6}}{4}\sin^3(\beta) - \sqrt{6}\sin(\beta)\cos^2(\beta)\right)K - \left(\frac{\sqrt{10}}{4}\sin^3(\beta) - \frac{\sqrt{10}}{2}\sin(\beta)\,\cos^2(\beta)\right)N \quad (42)$$

$$N' = \left(\frac{\sqrt{6}}{4}\sin(\beta) + \frac{\sqrt{6}}{4}\cos^2(\beta)\,\sin(\beta)\right)P - \left(\frac{\sqrt{10}}{2}\sin(\beta) - \frac{3\sqrt{10}}{4}\sin^3(\beta)\right)L - \left(\frac{\sqrt{15}}{2}\cos^3(\beta) - \frac{\sqrt{15}}{2}\cos(\beta)\right)K + \left(\frac{3}{2}\cos^3(\beta) - \frac{1}{2}\cos(\beta)\right)N \quad (43)$$

$$P' = \left(\frac{1}{4}\cos^3(\beta) + \frac{3}{4}\cos(\beta)\right)P - \left(\frac{\sqrt{15}}{4}\cos^3(\beta) - \frac{\sqrt{15}}{4}\cos(\beta)\right)L - \frac{\sqrt{10}}{4}\sin^3(\beta)\,K + \left(\frac{\sqrt{6}}{4}\sin^3(\beta) - \frac{\sqrt{6}}{2}\sin(\beta)\right)N \quad (44)$$

For rotation around the Z axis (i.e., yaw), the third order rotation matrix can be a 16×16 matrix, where γ is the rotation angle around the Z axis, the modified signals are as follows:

$$W' = W \quad (45)$$

$$X' = \cos(\gamma)X - \sin(\gamma)Y \quad (46)$$

$$Y' = \sin(\gamma)X + \cos(\gamma)Y \quad (47)$$

$$Z' = Z \quad (48)$$

$$V' = \cos(2\gamma)V + \sin(2\gamma)U \quad (49)$$

$$T' = \cos(\gamma)T + \sin(\gamma)S \quad (50)$$

$$R' = R \quad (51)$$

$$S' = \cos(\gamma)S - \sin(\gamma)T \quad (52)$$

$$U' = \cos(2\gamma)U - \sin(2\gamma)V \quad (53)$$

$$Q' = \cos(3\gamma)Q + \sin(3\gamma)P \quad (54)$$

$$O'=\cos(2\gamma)O+\sin(2\gamma)N \quad (55)$$

$$M'=\cos(\gamma)M+\sin(\gamma)L \quad (56)$$

$$K'=K \quad (57)$$

$$L'=\cos(\gamma)L-\sin(\gamma)M \quad (58)$$

$$N'=\cos(2\gamma)N-\sin(2\gamma)O \quad (59)$$

$$P'=\cos(3\gamma)P-\sin(3\gamma)Q \quad (60)$$

In the different embodiments, a head tracker or sensors can be mounted on the headphones to determine the head orientation, which is used to rotate the ambisonic signals or in another method change the positions of virtual speakers. In one embodiment, positions of virtual speakers are changed based on the head movement, and in another embodiment, a rotation matrix is used to rotate the ambisonic signals. One embodiment can be used for any ambisonic order. The other embodiment uses only one set of HRTFs and may use less computation as there is no need to change the positions of virtual speakers. If the binaural signals are generated directly from HOA signals (without mapping HOA signals to virtual loudspeakers), the embodiment using only one set of HRTFs will further reduce computation overhead.

Figure 5:
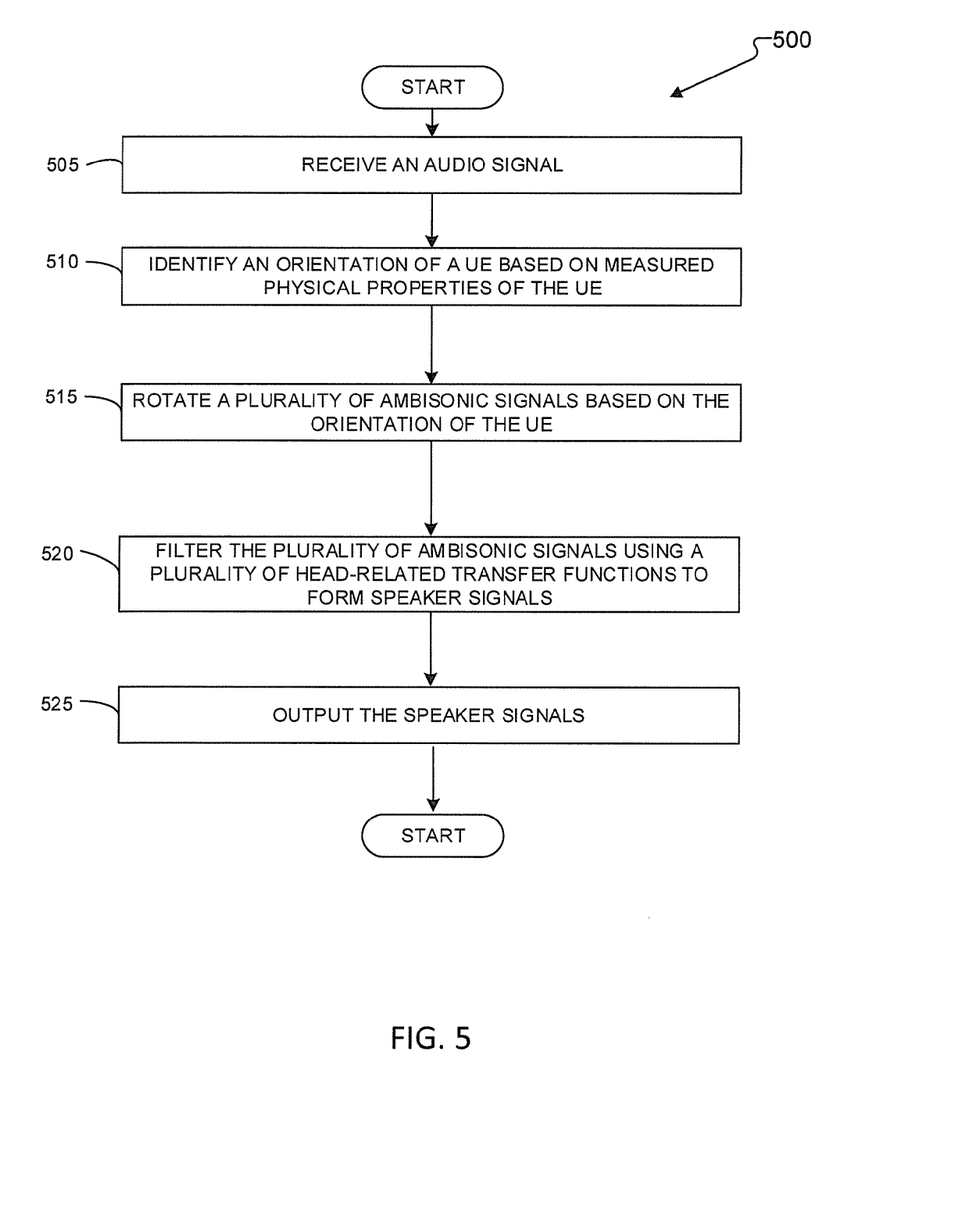
FIG. 5 illustrates process for adaptive ambisonic binaural rendering according to this disclosure.

FIG. 5 illustrates process 500 for adaptive ambisonic binaural rendering according to this disclosure. The embodiment shown in FIG. 5 is for illustration only. Other embodiments could be used without departing from the scope of the present disclosure. A processor, such as processor 140 as shown in FIG. 5, can perform different steps of process 500.

At step 505, a processor is configured to receive an audio signal, the audio signal comprising a plurality of ambisonic signals. At step 510, the processor is configured to identify an orientation of the UE based on the measured physical properties of the UE. Sensors can be configured to sense the physical properties of the UE. The physical properties could include, for example, a touch input on the headset or the HMD, camera information, gesture information, a gyroscopic information, air pressure information, a magnetic information, an acceleration information, a grip information, a proximity information, a color information, a bio-physical information, a temperature/humidity information, an illumination information, an UV information, an Electromyography (EMG) information, an Electroencephalogram (EEG) information, an Electrocardiogram (ECG) sensor, an IR sensor, an ultrasound sensor, an iris sensor, a fingerprint sensor, etc.

At step 515 the processor is configured to rotate the plurality of ambisonic signals based on the orientation of the UE. The processor can apply at least one rotation matrix to the plurality of ambisonic signals. The at least one rotation matrix comprises a rotation matrix for each axis of three axes. If the orientation includes a rotation in a direction, the processor can be configured to rotate the sound field of the plurality of ambisonic signals opposite the direction. The processor can also be configured to map the plurality of ambisonic signals to one or more virtual speakers of a sound field.

At step 520, the processor is configured to filter the plurality of ambisonic signals using a plurality of head-related transfer functions to form speaker signals. The head related transfer functions could be stored in a memory element. The plurality of head-related transfer functions comprises two head-related transfer functions used for any rotation of the plurality of ambisonic signals. At step 525, the processor is configured to output the speaker signals.

One or more embodiments of this disclosure provide multichannel audio downmixing via ambisonic conversion. An embodiment provides a novel audio downmixing method based on ambisonic mapping. Input multichannel audio is mapped to spherical harmonics to generate an ambisonic representation of the sound field. The ambisonic signals are mapped to any playback system with a smaller number of speakers. A number of common downmix distortions are discussed and solutions are introduced to reduce some distortions such as signal coloration. Informal listening tests have demonstrated the merit of the proposed method compared to direct audio downmixing.

Different embodiments of this disclosure recognize and take into account that production of multichannel audio content keeps growing and becomes more widespread. Playback systems currently in use are capable to play back only small number of audio channels such as the legacy 5.1 format. Therefore there is a need for high quality methods to downmix large number of audio channels. Prior downmix methods fall into two passive and active categories. Passive methods use fixed coefficients to combine input channels into output channels. The passive methods sometimes produce unsatisfactory results and cause audio artifacts and spatial and timbral distortions. On the other hand, active downmix methods adapt the downmix procedure to the input audio and reduce distortions caused by passive methods.

In this disclosure, one or more embodiments provide an active downmix method based on the conversion of input multichannel audio to HOA signals. The playback setup can be independent of the input audio channels configuration. The HOA signals can be mapped to any speaker setup (e.g. smaller number of speakers, asymmetric configuration, etc.). One or more of the embodiments reduce common distortions such as coloration (i.e. comb filter effects) and loudness preservation to improve audio quality of the downmixed audio.

An embodiment of this disclosure provides HOA based audio downmixing. In this embodiment, the input audio channels are decomposed in the spherical coordinates (i.e. mapped onto the spherical harmonic bases) to generate fourth order HOA signals as follows:

$$B=YS_{in} \quad (61)$$

Where Y is a matrix of the fourth order spherical harmonics in the direction of the input channels, $S_{in}$ is the matrix containing input audio channels (except the low frequency effect (IMF) channels), and B is the matrix of HOA signals. The order of HOA signals can be increased to better represent the original sound field. Fourth order ambisonic representation for many sound fields would be sufficient and would reduce the computational load. The HOA signals can be mapped to any play back system using an HOA renderer as follows:

$$S_{out}=DB \quad (62)$$

where D is the HOA renderer and $S_{out}$ is the output audio channels. The input LFE channels are used in the downmixed output audio. Some sound images may be distorted when a larger number of channels are downmixed to a smaller playback system. An example embodiment provides a sound field on a smaller playback system with the best possible audio quality.

Different embodiments of this disclosure recognize and take into account that audio downmixing results in some distortions. Issues can be caused by 3D to 2D conversion wherein the sound field envelopment (from above) and accuracy of sound source vertical localization are degraded. Some other issues that might be observed include coloration, loudness distortion, spectral distortion, direct to ambient sound ratio, auditory masking, etc.

Different embodiments of this disclosure recognize and take into account that coloration (i.e. comb filter effect) is caused by the addition of correlated signals where some frequency components are amplified or cancelled. That distortion in downmixed audio is observed when height channels are correlated with the horizontal channels but are not time-aligned (delayed by some msec). This misalignment occurs when a spaced microphone array is used to make multi-channel recordings of a sound field.

Figure 6:
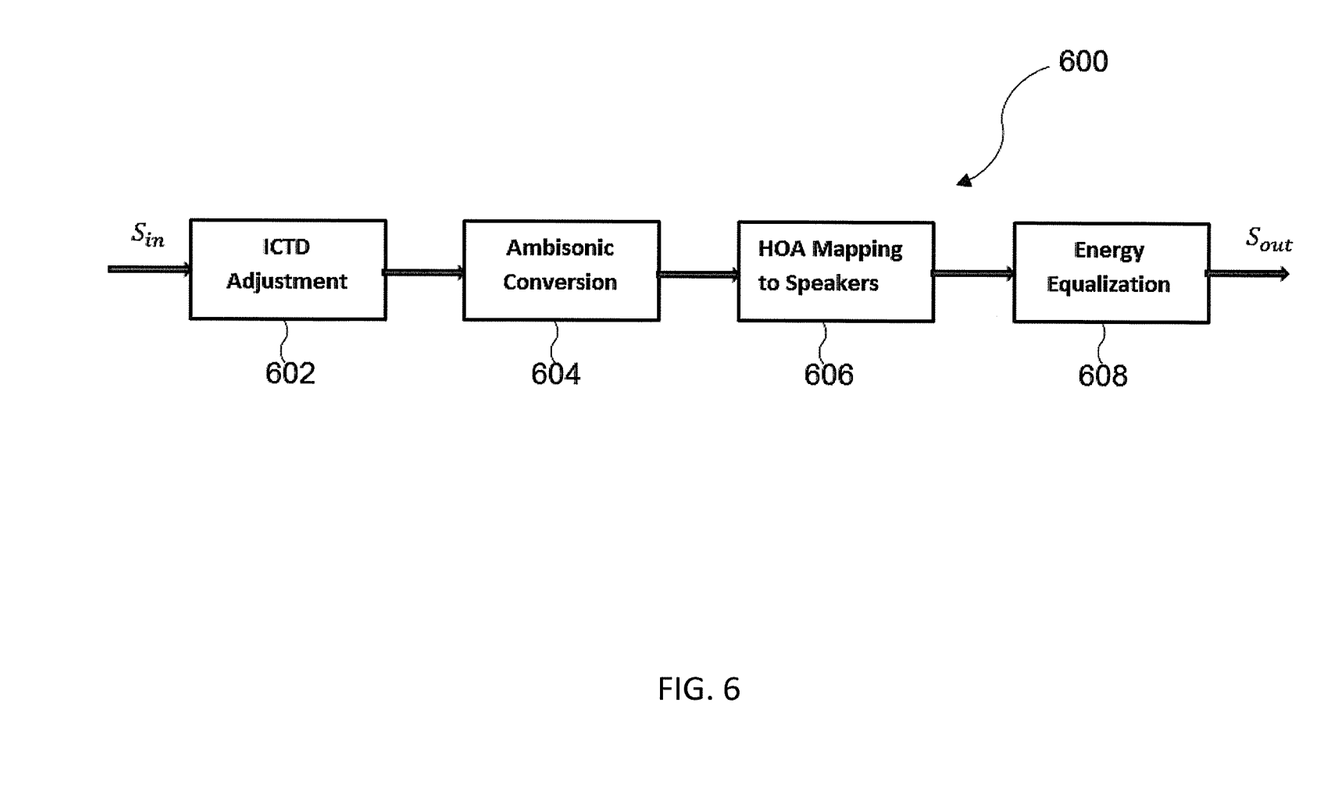
FIG. 6 illustrates block diagram for high order ambisonic downmixing according to an embodiment of this disclosure.

FIG. 6 illustrates block diagram 600 for high order ambisonic downmixing according to an embodiment of this disclosure. The embodiment of the high order ambisonic downmixing illustrated in FIG. 6 is for illustration only.

At block 602, a processor provides a correlation-based technique to adjust the Inter-Channel Time Delay (ICTD) between highly correlated input channels to reduce coloration. Since sound fields might consist of many sound sources, the processor divides input audio channels into subgroups based on the cross correlation. Channels with cross correlation greater than 0.2 are placed in the same group and then time aligned to the channel with the largest energy in that group. In one example embodiment, the maximum delay to be aligned is set to 10 msec. This maximum delay might not be caused by the distance between microphones in a microphone array, but might be caused by post-recording effects. One embodiment of this disclosure recognizes that there are large delays between channels in the MPEG 22.2-channel audio files, and sets the maximum delay at 10 msec. In one example embodiment, the processor does not align spectral components differently.

At block 604, the processor can perform ambisonic conversion. Input multichannel audio is mapped to spherical harmonics to generate an ambisonic representation of the sound field. At block 606, the processor can map the high order ambisonics to virtual speakers. The ambisonic signals are mapped to any playback system with a smaller number of speakers. A number of common downmix distortions are discussed and solutions are introduced to reduce some distortions such as signal coloration. Informal listening tests have demonstrated the merit of the proposed method compared to direct audio downmixing.

In one example embodiment, in order to preserve the energy in the downmixed sound field, at block 608, the energy of downmixed audio can be equalized in both spectral domain and space. In this example, energy distribution in a downmixed sound field can be more easily controlled. In the spectral domain, the energy of the downmixed channels is adjusted in the octave bands to make it equal the energy of the input sound field. The energy adjustment can also be done separately for the left and right channels to keep the energy ratio of the left and right channels the same as that in the input sound field Some sound sources might be partially masked by louder sounds in a downmixed sound field, caused by the auditory masking effects in the frequency and/or time domain. Sound sources might be located at different location in the input sound field and therefore are audible. In a downmixed sound field, many sounds might be coming from the same direction and therefore auditory masking (both temporal and simultaneous) can be more effective. One way to reduce masking effects in a downmixed sound field is to apply different gains to input audio channels prior to downmixing to smaller number of channels One or more embodiments of this disclosure recognize and take into account that whitening of broadband sounds is another distortion observed in some downmixed sound fields. An example embodiment avoids adding uncorrelated speaker signals that have almost identical spectrum. This technique works well for independently identically distributed (i.i.d.) sources. For other sources (e.g. localized sources) the spectral correlation of horizontal and height channels would be low. This is useful to replace the speaker signals in height speakers. If there is a mixture of ambient sounds and localized sources in height channels, the height speaker signals have to be decomposed into localized and ambient sounds, and then only the ambient sounds could be replaced (with proper energy adjustment).

An embodiment of this disclosure provides an audio downmixing method where input audio channels are transformed to HOA signals that can be mapped to any playback setup. This embodiment includes a spectral correction component to equalize the energy of the downmixed sound field in the left and right channels. Highly correlated input channels can be time aligned to reduce coloration. This embodiment can be used to downmix multichannel audio files with different configurations (e.g. 22.2, 14.0, 11.1, and 9.0) to a standard 5.1 configuration. Also 5.1 audio files can be converted to an irregular 5.1 format where loudspeakers are placed in irregular locations. As an extension to this example embodiment, HRTFs can be used to find the ear signals for the input and output sound fields. One example downmixed sound field can be found to result in the least difference between the ear signals for the input and output sound fields.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE), the UE comprising:
a memory element configured to store a plurality of head-related transfer functions;
a processor configured to:
receive an audio signal, the audio signal comprising a plurality of ambisonic signals;
identify an orientation of the UE based on physical properties of the UE;
rotate the plurality of ambisonic signals based on the orientation of the UE;
map the plurality of ambisonic signals to one or more virtual speakers of a sound field;
wherein, in response to the orientation of the UE including a rotation in a direction, the processor configured to rotate the plurality of ambisonic signals comprises the processor configured to rotate the sound field of the plurality of ambisonic signals opposite the direction;
filter the plurality of ambisonic signals using the plurality of head-related transfer functions to form speaker signals; and
output the speaker signals.

2. The UE of claim 1, wherein the processor configured to rotate the plurality of ambisonic signals based on the orientation of the UE comprises the processor configured to:
apply at least one rotation matrix to the plurality of ambisonic signals.

3. The UE of claim 1, wherein a position of the virtual speakers with respect to the UE remains unchanged.

4. The UE of claim 1, wherein the at least one rotation matrix comprises a rotation matrix for each axis of three axes.

5. The UE of claim 1, wherein the plurality of head-related transfer functions comprises two head-related transfer functions used for any rotation of the plurality of ambisonic signals.

6. The UE of claim 4, wherein the rotation matrix for each axis is for third order ambisonic signals.

7. The UE of claim 1, further comprising:
at least one sensor configured to measure the physical properties of the UE.

8. The UE of claim 1, wherein the processor is further configured to receive the physical properties of the UE from an at least one external sensor.

9. A method for audio signal processing, the method comprising:
receiving an audio signal, the audio signal comprising a plurality of ambisonic signals;
identifying an orientation of the user equipment (UE) based on physical properties of the UE;
rotating the plurality of ambisonic signals based on the orientation of the UE;
mapping the plurality of ambisonic signals to one or more virtual speakers of a sound field;
wherein, in response to the orientation of the UE including a rotation in a direction, rotating the plurality of ambisonic signals comprises rotating the sound field of the plurality of ambisonic signals opposite the direction;
filtering the plurality of ambisonic signals using a plurality of head-related transfer functions to form speaker signals; and
outputting the speaker signals.

10. The method of claim 9, wherein rotating the plurality of ambisonic signals based on the orientation of the UE comprises:
applying at least one rotation matrix to the plurality of ambisonic signals.

11. The method of claim 9, wherein a position of the virtual speakers with respect to the UE remains unchanged.

12. The method of claim 9, wherein the at least one rotation matrix comprises a rotation matrix for each axis of three axes.

13. The method of claim 9, wherein the plurality of head-related transfer functions comprises two head-related transfer functions used for any rotation of the plurality of ambisonic signals.

14. The method of claim 12, wherein the rotation matrix for each axis is for third order ambisonic signals.

15. The method of claim 9, further comprising:
measuring the physical properties of the UE.

16. The method of claim 9, further comprising:
receiving the physical properties of the UE from an at least one external sensor.

* * * * *